(12) United States Patent
Dauer et al.

(10) Patent No.: US 7,037,349 B2
(45) Date of Patent: May 2, 2006

(54) METHOD AND APPARATUS FOR FUEL/AIR PREPARATION IN A FUEL CELL

(75) Inventors: Kenneth J. Dauer, Avon, NY (US); Michael R. Salemi, Rochester, NY (US); Richard F. Nashburn, Honeoye Falls, NY (US); John Kirwan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 609 days.

(21) Appl. No.: 10/229,550

(22) Filed: Aug. 28, 2002

(65) Prior Publication Data

US 2003/0233789 A1 Dec. 25, 2003

Related U.S. Application Data

(60) Provisional application No. 60/390,962, filed on Jun. 24, 2002.

(51) Int. Cl.
*C10K 3/06* (2006.01)
*C10J 3/00* (2006.01)

(52) U.S. Cl. .................. 48/214 A; 48/127.9; 422/190; 422/193; 422/198; 422/211; 60/274

(58) Field of Classification Search ................ 422/105, 422/110, 111, 190, 193, 198, 211; 48/197 R, 48/127.9, 214 A; 60/274
See application file for complete search history.

(56) References Cited

U.S. PATENT DOCUMENTS

| | | | |
|---|---|---|---|
| 5,110,559 A | * | 5/1992 | Kondo et al. ................ 422/109 |
| 6,126,908 A | * | 10/2000 | Clawson et al. ............ 422/190 |
| 6,245,303 B1 | * | 6/2001 | Bentley et al. ............. 422/193 |
| 6,321,145 B1 | | 11/2001 | Rajashekara |
| 6,383,468 B1 | * | 5/2002 | Schussler et al. ........... 423/651 |
| 6,423,896 B1 | | 7/2002 | Keegan |
| 6,455,185 B1 | | 9/2002 | Bircann et al. |
| 6,485,852 B1 | | 11/2002 | Miller et al. |

(Continued)

FOREIGN PATENT DOCUMENTS

EP          1094031         *   4/2001

(Continued)

OTHER PUBLICATIONS

Copy of EP Search Report dated Nov. 3, 2003.

*Primary Examiner*—N. Bhat
(74) *Attorney, Agent, or Firm*—Paul L. Marshall

(57) ABSTRACT

A fast start-up catalytic reformer for producing hydrogen-rich reformate from hydrocarbon fuel includes a reactor having an inlet for receiving a flow of fuel and a flow of air, a reforming catalyst disposed within a reforming chamber in the reactor, and an outlet for discharging the produced reformate stream. An ignition device within the reactor tube ignites a first lean mixture in combustion mode to generate exhaust gases to warm the catalyst which also warms the wall of the reactor adjacent the catalyst. The reactor then switches over to a rich fuel/air mixture during reforming mode. A jacket concentrically surrounds the reactor, defining a mixing chamber therebetween which communicates with the reforming chamber via openings in the wall of the reactor. Fuel entering the reformer in combustion mode is injected directly into the reforming chamber to provide rapid warming of the catalyst. Fuel entering the reformer in reforming mode is sprayed onto the outside of the reactor in the mixing chamber, preferably in the heated region of the tube for very rapid vaporization.

34 Claims, 2 Drawing Sheets

U.S. PATENT DOCUMENTS

| | | |
|---|---|---|
| 6,509,113 B1 | 1/2003 | Keegan |
| 6,551,734 B1 | 4/2003 | Simpkins et al. |
| 6,562,496 B1 | 5/2003 | Faville et al. |
| 6,608,463 B1 | 8/2003 | Kelly et al. |
| 6,613,468 B1 | 9/2003 | Simpkins et al. |
| 6,613,469 B1 | 9/2003 | Keegan |
| 6,627,339 B1 | 9/2003 | Haltiner, Jr. |
| 6,630,264 B1 | 10/2003 | Haltiner, Jr. et al. |
| 6,869,456 B1 * | 3/2005 | Salemi et al. ............. 48/197 R |
| 6,887,436 B1 * | 5/2005 | Fisher et al. ................ 422/177 |
| 2001/0016275 A1 | 8/2001 | Takamura |

FOREIGN PATENT DOCUMENTS

| | | | |
|---|---|---|---|
| EP | 1198020 | | 4/2002 |
| EP | 1203750 | | 5/2002 |
| EP | 1231183 | | 8/2002 |
| EP | 1376726 | * | 1/2004 |
| JP | 2002151128 | | 5/2002 |
| WO | 9931012 | | 6/1999 |

* cited by examiner

METHOD AND APPARATUS FOR FUEL/AIR PREPARATION IN A FUEL CELL

CROSS-REFERENCE TO RELATED APPLICATIONS

The present application claims priority from U.S. Provisional Patent Application of the same title, Ser. No. 60/390,962, filed Jun. 24, 2002.

TECHNICAL FIELD

The present invention relates to a catalytic reformer and method for converting a hydrocarbon stream to a reformate fuel stream comprising hydrogen; more particularly, to a fast light-off catalytic reformer and method for rapid production of reformate for hydrogen coldstart in an internal combustion engine; and most particularly, to an improved method and apparatus for rapid vaporization and mixing of fuel and air upon entry into the reformer. The present invention is useful for providing reformate to a fuel cell, and especially a solid oxide fuel cell.

BACKGROUND OF THE INVENTION

A catalytic hydrocarbon fuel reformer converts a fuel stream comprising, for example, natural gas, light distillates, methanol, propane, naphtha, kerosene, gasoline, diesel fuel, or combinations thereof, and air, into a hydrogen-rich reformate fuel stream comprising a gaseous blend of hydrogen, carbon monoxide and nitrogen (ignoring trace components). In the reforming process, the raw hydrocarbon fuel stream is typically percolated with oxygen in the form of air through a catalyst bed or beds contained within reactor tubes mounted in the reformer vessel. The catalytic conversion process is typically carried out at elevated catalyst temperatures in the range of about 700° C. to about 1100° C. The produced hydrogen-rich reformate stream may be used, for example, as the fuel gas stream feeding the anode of an electrochemical fuel cell after passing the reformate stream through a water gas shift reactor and/or other purification means such as a carbon monoxide selective oxidizer. Reformate is particularly well suited to fueling a solid oxide fuel cell (SOFC) system because the purification step for removal of carbon monoxide is not required for an SOFC.

During operation of most reformers of this type, tail gas from the fuel cell is burned and the burner exhaust passes through a plenum within the vessel, contacting and heating the outer surface of the reactor tubes and thereby heating the catalyst.

The hydrogen-rich reformate stream may also be used as a hydrogen fuel to fuel a spark-ignited (SI) engine, either alone or in combination with gasoline. Hydrogen-fueled vehicles are of interest as low-emissions vehicles because hydrogen as a fuel or a fuel additive can significantly reduce air pollution and can be produced from a variety of fuels. Hydrogen permits an engine to run with very lean fuel-air mixtures that greatly reduce production of NOx. As a gasoline additive, small amounts of supplemental hydrogen fuel may allow conventional gasoline internal combustion engines to reach nearly zero emissions levels.

A problem in the past has been how to elevate the temperature of the catalyst quickly in order to begin generating reformate in the shortest possible time. One approach has been to incorporate into the reformer a "fast light-off" system wherein a fuel/air mixture, essentially stoichiometric, is ignited in the reformer, preferably upstream of the catalyst, for a brief period at start-up. The exhaust gas, passing through the reformer in contact with the catalyst, heats the catalyst very rapidly. Such combustion typically is needed for only a few seconds, after which ignition is terminated and the mixture is made very fuel-rich for reforming.

A problem still exists, however, in how to rapidly and uniformly vaporize and mix the fuel entering the reformer to provide both an immediately and uniformly combustible fuel/air mixture for the combustion mode and a uniformly reformable fuel/air mixture for the reforming mode of operation.

What is needed is a means for rapidly and uniformly vaporizing and air-mixing the fuel being provided to a catalytic fuel reformer.

SUMMARY OF THE INVENTION

A catalytic reformer and method for fast start-up is provided. The reformer includes a reactor having an inlet for receiving a flow of fuel and a flow of air, a reforming catalyst disposed within a reforming chamber in the reactor for converting the fuel and air to a reformate stream, and an outlet for discharging the produced reformate stream. An ignition device is disposed within the reactor for initiating an exothermic reaction between the fuel and air. Heat generated thereby warms the catalyst to provide fast light-off of the reformer, and also warms the wall of the reactor adjacent the catalyst. An associated control system selects fuel and air flow delivery rates and operates the ignition device to achieve fast light-off of the reforming catalyst at start-up and to maintain the catalyst at a temperature sufficient to optimize reformate yield. The system operates at a lean fuel/air mixture during ignition and combustion mode, then switches over to a rich fuel/air mixture during reforming mode. A jacket concentrically surrounds the reactor defining a mixing chamber therebetween which communicates with the reforming chamber in the reactor via a plurality of radial openings in the wall of the reactor. Fuel entering the reformer in combustion mode is injected directly into the reforming chamber to provide rapid warming of the catalyst. However, fuel entering the reformer in reforming mode is sprayed onto the outside of the reactor in the mixing chamber, preferably in the heated region of the reactor. Air, which may also be heated by the heated region of the reactor, is admitted to the mixing chamber in a controlled swirl pattern which entrains the vaporized fuel very rapidly to form a uniform fuel/air vapor mixture for admission to the reforming chamber. In the case where the incoming air is also heated, the heated air also serves to help vaporize the fuel. In a second embodiment, only the heated air is used to vaporize the fuel and a second injector is not used.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
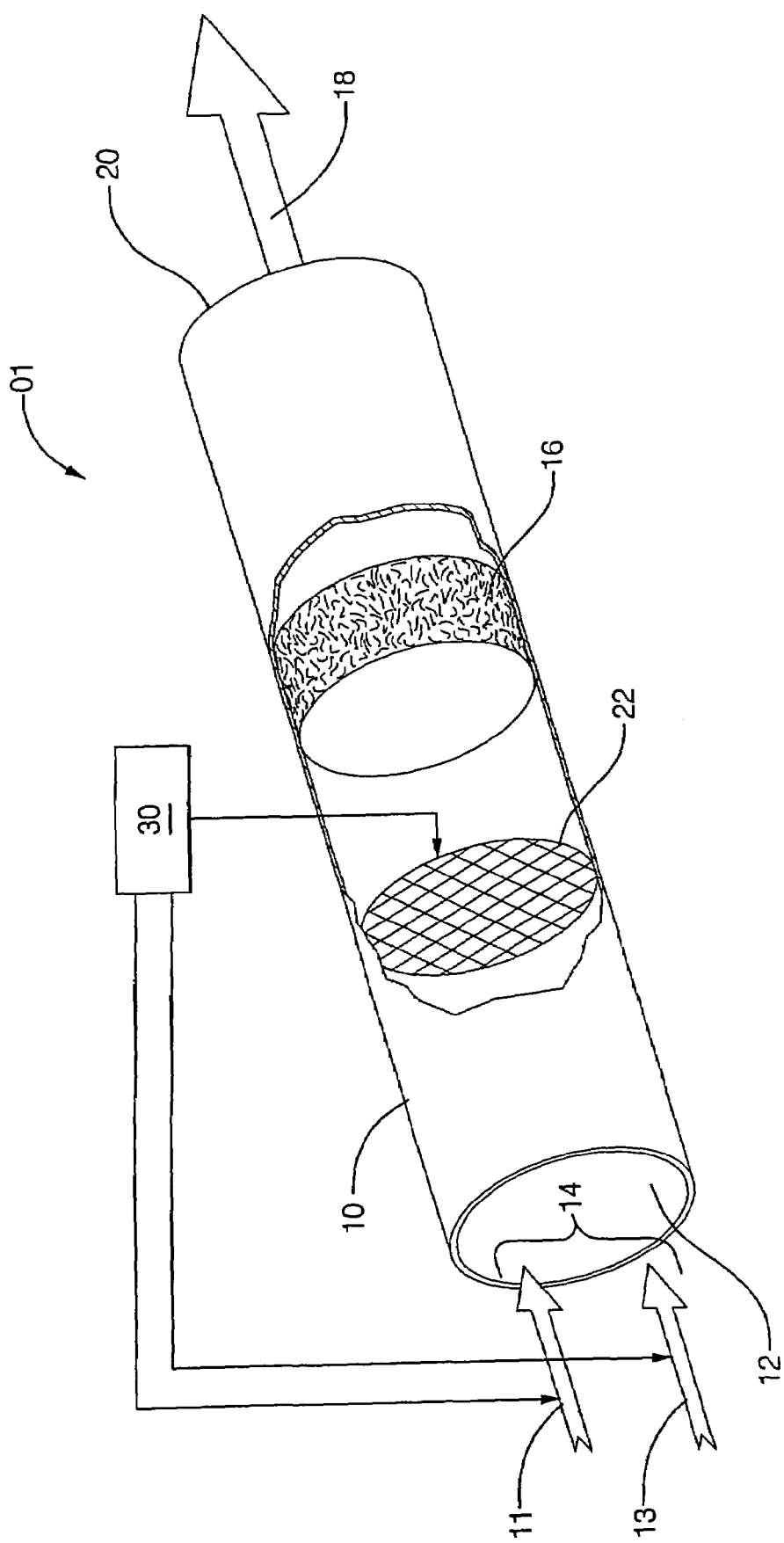
FIG. 1 is an isometric view, partially in section, of a fast light-off catalytic reformer.

Referring to FIG. 1, a fast light-off catalytic reformer 01 includes a reactor 10 having an inlet 12 in a first end for receiving a flow of fuel 11 and a flow of air 13, shown as combined fuel-air mixture 14. Reactor 10 may be any shape, but preferably comprises a substantially cylindrical reactor tube. While the present description discusses a single reactor 10, reforming catalyst 16, and ignition device 22, the present fast light-off reformer may comprise more than one reactor, as desired.

Reforming catalyst 16 is disposed within reactor 10 and may comprise any reforming catalyst material suitable for converting the fuel feedstock and air to reformate, including, but not limited to, for example, rhodium, platinum, their alloys, and combinations thereof. Preferably, a protective coating or firewall (not shown) is disposed about catalyst 16. During operation, a fuel-rich mixture comprising air and a liquid hydrocarbon fuel such as natural gas, light distillates, methanol, propane, naphtha, kerosene, gasoline, diesel fuel, or combinations thereof, is converted by catalyst 16 to a hydrogen rich reformate fuel stream 18 that is discharged through outlet 20.

Ignition device 22 is disposed within the reactor 10 to initiate an exothermic reaction in fuel and air flow 14. Heat generated by this reaction is used to provide fast light-off (i.e., extremely rapid heating) of reforming catalyst 16. The ignition device preferably is located upstream of the catalyst, but may alternatively be located at the front face thereof, within the catalyst, or at the rear face of the catalyst. Preferably, the ignition device 22 is disposed within the reactor 10 upstream of the reforming catalyst 16, i.e., between inlet 12 and reforming catalyst 16. Ignition device 22 may be any device suitable for initiating exothermic reactions between fuel and air 14, including, but not limited to, a catalytic or non-catalytic substrate, such as a wire or gauze as shown in FIG. 1, for receiving electric current from a voltage source; a spark plug; a glow plug; or any combination thereof. An associated control system 30 selects and maintains the appropriate fuel and air delivery rates and operates the ignition device 22 so as to achieve fast light off of the reforming catalyst 16 at start-up and to maintain catalyst 16 at a temperature sufficient to optimize reformate 18 yield. The control means used herein may comprise any of various control means known in the art for providing air and fuel control and metering functions.

Figure 2:
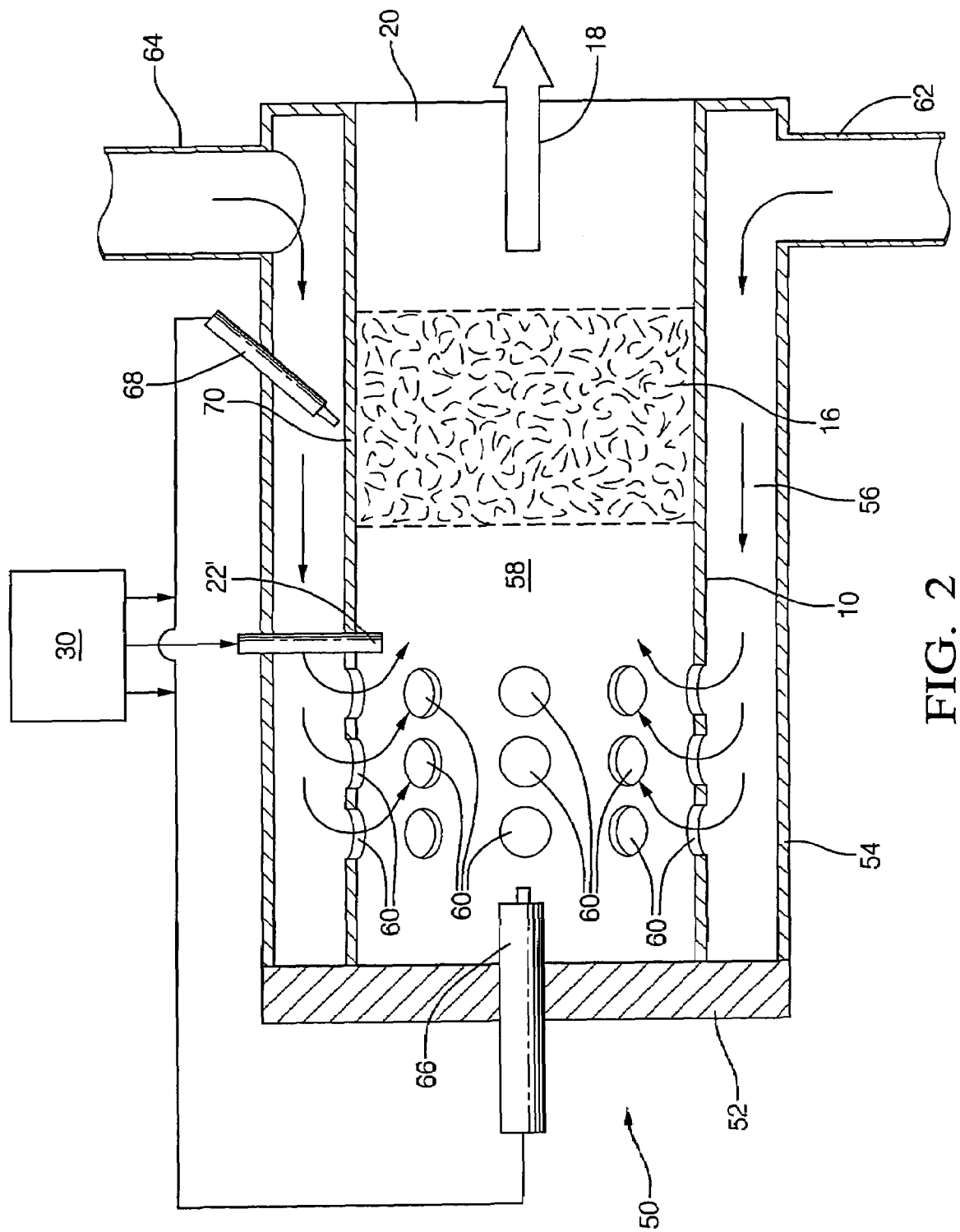
FIG. 2 is a cross-sectional view of a fast light-off catalytic reformer as modified in accordance with the invention.

Referring to FIG. 2, an improved fast light-off catalytic fuel reformer 50 in accordance with the invention is seen to be adapted from reformer 01 as shown in FIG. 1. Components thereof having identical function are identically numbered, and those having similar or improved function are identically numbered with a prime indicator. New components bear new numbers.

In improved reformer 50, inlet 12 is eliminated and that end of reactor 10 is blocked by end plate 52. A jacket 54 is provided concentric with reactor 10 and defining an annular mixing chamber 56 therebetween which is closed at both axial ends. Mixing chamber 56 communicates with reforming chamber 58 within reactor 10 via a plurality of openings 60 formed in the wall of reactor 10. Air for combustion and for reforming enters reformer 50 preferably via either or both of two separate inlet ducts 62,64 formed in the wall of jacket 54 and entering mixing chamber 56, duct 62 entering the jacket radially and duct 64 entering tangentially. Controller 30 controls the mass flow of air through each of these ducts in accordance with a programmed algorithm to produce an optimum air flow pattern within mixing chamber 56. Controller 30 further controls the timing and flow of combustion fuel injected by a first fuel injector 66 mounted in end plate 52 directly into reforming chamber 58 during combustion mode where the fuel mixes with air entering from mixing chamber 56 via openings 60. Controller 30 further controls an igniter 22', preferably a spark plug or other sparking device disposed through the walls of reactor 50 into chamber 58. Controller 30 further controls the timing and flow of reformer fuel injected by a second fuel injector 68 mounted through the wall of jacket 54 and positioned to spray fuel on the outer surface 70 of reactor 10, preferably proximal to the location of catalyst 16 because the reforming catalyst is exothermic. Spraying fuel on the wall at that point helps to cool the catalyst and is the optimum location for vaporizing the fuel. Fuel so vaporized during reforming mode is mixed into air entering mixing chamber 56 in accordance with the optimum pattern described above and enters reforming chamber as a fully vaporized, uniform vapor mixture via openings 60, ready for optimal reforming by catalyst 16.

In a second embodiment, incoming air for reforming enters mixing chamber 56 via either or both inlet ducts 62,64 and is heated by passing over outer surface 70 of reactor 10 proximal to the location of the catalyst 16. The air heated by the catalyst in this manner serves to vaporize the fuel entering reforming chamber 58. In this embodiment, second injector 68 may be omitted.

In a method for starting up reformer 50, control system 30 directs flows of fuel through first injector 66 and air through ducts 62,64 into reactor 10 at first predetermined fuel and air flow rates to provide a near-stoichiometric lean fuel/air mixture at a first fuel:air mass flow ratio. Such lean flow continues for a first predetermined period of time, generally less than ten seconds and preferably about 2 seconds, during which time the mixture is periodically ignited by igniter 22' to produce flame and hot exhaust which sweeps through and heats catalyst 16 and, by conduction, outer surface 70. At the end of this time, both the flow of fuel into reactor 10 and ignition of the fuel mixture are terminated. Fuel flow is stopped for a second predetermined period of time, generally less than five seconds and preferably between about 100 and 200 milliseconds, allowing combustion to cease, thereby preventing ignition of subsequent fuel-rich mixture and coking or fouling of the catalyst surfaces. Fuel flow through second injector 68 is then established by control system 30 at a second predetermined flow rate, mixing with air provided through ducts 62,64 to provide a fuel-rich mixture for reforming to generate reformate 18 (exhausted through outlet 20), preferably at a second fuel:air ratio of about 2.5:1 to about 5:1 and preferably about 3:1 with respect to the first fuel/air ratio. Air flow may also be readjusted by control system 30 in providing the desired first and second flow ratios.

The present fast light-off catalytic reformer and method produce rapid, high yields of reformate fuel. The produced reformate 18 may be bottled in a vessel or used to fuel any number of systems operating partially or wholly on reformate fuel. As shown in FIG. 1 for reformer 01, such power generation systems for reformer 50 may include, but are not limited to, engines such as spark ignition engines, hybrid vehicles, diesel engines, fuel cells, particularly solid oxide fuel cells, or combinations thereof. The present fast light-off reformer and method may be variously integrated with such systems, as desired. For example, the present fast light-off reformer may be employed as an on-board reformer for a vehicle engine operating wholly or partially on reformate, the engine having a fuel inlet in fluid communication with the reformer outlet 20 for receiving reformate 18 therefrom. The present fast light-off reformer and method is particularly suitable for use as an on-board reformer for quickly generating reformate 18 for initial start-up of a system. The present reformer and method are particularly advantageous for hydrogen cold-start of an internal combustion engine, providing a supply of hydrogen-rich reformate which allows the engine exhaust to meet SULEV emissions levels immediately from cold-start. Vehicles wherein a fast light-off reformer operated in accordance with the present invention is useful may include automobiles, trucks, and other land vehicles, boats and ships, and aircraft including spacecraft.

While the invention has been described by reference to certain preferred embodiments, it should be understood that numerous changes may be made within the spirit and scope of the inventive concepts described. Accordingly, it is intended that the invention not be limited to the disclosed embodiments, but that it have the full scope permitted by the language of the following claims.

What is claimed is:

1. A catalytic reformer for generating hydrogen-containing reformate fuel from hydrocarbons, comprising:
   a) a reactor closed at a first end thereof and having an outlet opening at a second end;
   b) a reforming catalyst disposed in said reactor and spaced apart from said closed end to define a combustion and reforming chamber;
   c) first fuel injection means disposed into said combustion and reforming chamber and connected to a source of hydrocarbon fuel;
   d) ignition means disposed in said combustion and reforming chamber for igniting fuel injected by said first injector;
   e) a jacket disposed around and off-spaced from said reactor to define a mixing chamber therebetween, said mixing chamber communicating with said combustion and reforming chamber via at least one opening in said reactor therebetween;
   f) air inlet means entering into said mixing chamber; and
   g) control means for controlling operating conditions of the reformer wherein said operating conditions controlled by the control means include at least one of controlling the timing of said ignition means, controlling the timing and flow of fuel through said first fuel injection means and said air inlet means to provide a first fuel/air mixture for combustion in said combustion and reforming chamber, and controlling the flow of fuel through said first fuel injection means and said air inlet means to provide a second fuel/air mixture for reforming in said combustion and reforming chamber to produce reformate fuel.

2. A reformer in accordance with claim 1 wherein said reactor has an outer surface having a region proximal to said catalyst within, and wherein air entering said mixing chamber is directed over said surface region.

3. A reformer in accordance with claim 1 wherein said reactor has a plurality of openings formed therein.

4. A catalytic reformer for generating hydrogen-containing reformate fuel from hydrocarbons, comprising:
   a) a reactor closed at a first end thereof and having an outlet opening at a second end;
   b) a reforming catalyst disposed in said reactor and spaced apart from said closed end to define a combustion and reforming chamber;
   c) first fuel injection means disposed into said combustion and reforming chamber and connected to a source of hydrocarbon fuel;
   d) ignition means disposed in said combustion and reforming chamber for igniting fuel injected by said first injector;
   e) a jacket disposed around and off-spaced from said reactor to define a mixing chamber therebetween, said mixing chamber communicating with said combustion and reforming chamber via at least one opening in said reactor therebetween;
   f) second fuel injection means disposed into said mixing chamber and connected to a source of hydrocarbon fuel;
   g) air inlet means entering into said mixing chamber; and
   h) control means for controlling operating conditions of the reformer.

5. A reformer in accordance with claim 4 wherein said operating conditions controlled by the control means include at least one of controlling the timing of said ignition means, controlling the timing and flow of fuel through said first fuel injection means and said air inlet means to provide a first fuel/air mixture for combustion in said combustion and reforming chamber, and controlling the flow of fuel through said second fuel injection means and said air inlet means to provide a second fuel/air mixture for reforming in said combustion and reforming chamber to produce reformate fuel.

6. A reformer in accordance with claim 4 wherein said reactor has an outer surface having a region proximal to said catalyst within, and wherein said second fuel injection means is so positioned to inject fuel onto said surface region.

7. A reformer in accordance with claim 4 wherein said first fuel/air mixture is leaner in fuel than said second fuel/air mixture.

8. A reformer in accordance with claim 4 wherein said second fuel/air mixture is about three times richer in fuel than said first fuel/air mixture.

9. A reformer in accordance with claim 4 wherein a length of time exists between cessation of said flow of fuel through said first injection means and commencement of said flow of fuel through said second injection means.

10. A reformer in accordance with claim 4 wherein said air inlet means includes at least two ducts.

11. A reformer in accordance with claim 10 wherein a first of said at least two ducts is disposed radially of said jacket and a second of said at least two ducts is disposed tangentially of said jacket.

12. A reformer in accordance with claim 11 wherein mass flows of air through said first and second ducts are independently controlled by said controller to provide a predetermined air flow pattern within said mixing chamber.

13. A method for starting up a catalytic reformer for generating hydrogen-containing reformate fuel from hydrocarbons comprising the steps of:
   a. directing a first flow of fuel and air into a reactor at a first predetermined fuel and air flow rate to provide a first fuel/air mixture;
   b. continuing said flow of fuel/air mixture for a predetermined period of time;
   c. combusting said fuel/air mixture by an igniter means to thereby heat a catalyst and an outer surface of said reactor;
   d. shutting off the fuel/air mixture;
   e. waiting a period of time for combustion to cease;

f. directing a second flow of fuel and air into said reactor at a second predetermined fuel/air mixture to generate said reformate fuel.

14. A method in accordance with claim 13 wherein at least one of said second flow of fuel and second flow of air is directed over said heated outer surface of said reactor.

15. A method in accordance with claim 13 wherein said fuel is selected from the group consisting of natural gas, light distillates, methanol, propane, naphtha, kerosene, gasoline, diesel fuel, and combinations thereof.

16. A method in accordance with claim 13 wherein said reformer is coupled to a fuel cell.

17. A method in accordance with claim 16 wherein said fuel cell is a solid-oxide fuel cell.

18. A method in accordance with claim 16 wherein said fuel cell provides electric power to a vehicle.

19. A method in accordance with claim 18 wherein said vehicle is selected from the group consisting of land vehicle, boat, ship, and aircraft including spacecraft.

20. A method in accordance with claim 13 wherein said reformer is coupled to an internal combustion engine for providing a hydrogen-rich reformate for combustion.

21. A method in accordance with claim 13 wherein said first fuel/air mixture ratio is at about stoichiometric.

22. A method in accordance with claim 13 wherein the range of said second fuel/air mixture ratio is about 2.5:1 to about 5:1 with respect to said first fuel/air mixture ratio.

23. A method in accordance with claim 13 wherein said period of time is less than five seconds.

24. A method in accordance with claim 13 wherein at least one of said directing, continuing, combusting, shutting off and waiting steps is controlled by a control means.

25. A vehicle comprising a hydrocarbon fuel reformer for generating hydrogen reformate fuel, said reformer including
   a reactor closed at a first end thereof and having an outlet opening at a second end,
   a reforming catalyst disposed in said reactor and spaced apart from said closed end to define a combustion and reforming chamber,
   first fuel injection means disposed into said combustion and reforming chamber and connected to a source of hydrocarbon fuel,
   ignition means disposed in said combustion and reforming chamber for igniting fuel injected by said first injector,
   a jacket disposed around and off-spaced from said reactor to define a mixing chamber therebetween, said mixing chamber communicating with said combustion and reforming chamber via at least one opening in said reactor therebetween,
   second fuel injection means disposed into said mixing chamber and connected to a source of hydrocarbon fuel,
   air inlet means entering into said mixing chamber, and
   control means for controlling operating conditions of the reformer.

26. A reformer for generating hydrogen-containing reformate fuel from hydrocarbons, comprising:
   a) a reactor closed at a first end thereof and having an outlet opening at a second end;
   b) a reforming catalyst disposed in said reactor and spaced apart from said closed end to define a reforming chamber;
   c) a jacket disposed around and off-spaced from said reactor to define a mixing chamber therebetween, said mixing chamber communicating with said reforming chamber via at least one opening in said reactor therebetween;
   f) fuel injection means disposed into said mixing chamber and connected to a source of hydrocarbon fuel;
   g) air inlet means entering into said mixing chamber; and
   h) control means for controlling operating conditions of the reformer, wherein said reactor has an outer surface having a region proximal to said catalyst within, and wherein said fuel injection means is so positioned to inject fuel onto said surface region.

27. A reformer in accordance with claim 26 wherein said reactor has an outer surface having a region proximal to said catalyst within, and wherein said air inlet means is so positioned to direct air onto said surface region.

28. A catalytic reformer for generating hydrogen-containing reformate fuel from hydrocarbons, comprising:
   a) a reactor closed at a first end thereof and having an outlet opening at a second end;
   b) a reforming catalyst disposed in said reactor and spaced apart from said closed end to define a combustion and reforming chamber;
   c) a first fuel injector disposed into said combustion and reforming chamber and connected to a source of hydrocarbon fuel;
   d) an igniter device disposed in said combustion and reforming chamber for igniting fuel injected by said first fuel injector;
   e) a jacket disposed around said reactor to define a mixing chamber therebetween, said mixing chamber communicating with said combustion and reforming chamber via at least one opening in said reactor therebetween;
   f) a second fuel injector disposed into said mixing chamber and connected to a source of hydrocarbon fuel;
   g) an air inlet entering into said mixing chamber; and
   h) control means for controlling operating conditions of the reformer.

29. A reformer in accordance with claim 28 wherein said operating conditions controlled by the control means include at least one of controlling the timing of said igniter device, controlling the timing and flow of fuel through said first fuel injector and said air inlet to provide a first fuel/air mixture for combustion in said combustion and reforming chamber, and controlling the flow of fuel through said second fuel injector and said air inlet to provide a second fuel/air mixture for reforming in said combustion and reforming chamber to produce reformate fuel.

30. A reformer in accordance with claim 28 wherein said reactor has an outer surface having a region proximal to said catalyst within, and wherein said second fuel injector is so positioned to inject fuel onto said surface region.

31. A reformer in accordance with claim 28 wherein said air inlet includes at least two ducts.

32. A reformer in accordance with claim 31 wherein a first of said at least two ducts is disposed radially of said jacket and a second of said at least two ducts is disposed tangentially of said jacket.

33. A catalytic reformer for generating hydrogen-containing reformate fuel from hydrocarbons, comprising:
   a) a reactor closed at a first end thereof and having an outlet opening at a second end;
   b) a reforming catalyst disposed in said reactor and spaced apart from said closed end to define a combustion and reforming chamber;
   c) a first fuel injector disposed into said combustion and reforming chamber and connected to a source of hydrocarbon fuel;

d) an igniter device disposed in said combustion and reforming chamber for igniting fuel injected by said first injector;
e) a jacket disposed around said reactor to define a mixing chamber therebetween, said mixing chamber communicating with said combustion and reforming chamber via at least one opening in said reactor therebetween;
f) an air inlet entering into said mixing chamber; and
g) control means for controlling operating conditions of the reformer wherein said operating conditions controlled by the control means include at least one of controlling the timing of said igniter device, controlling the timing and flow of fuel through said first fuel injector and said air inlet to provide a first fuel/air mixture for combustion in said combustion and reforming chamber, and controlling the flow of fuel through said first fuel injector and said air inlet to provide a second fuel/air mixture for reforming in said combustion and reforming chamber to produce reformate fuel.

34. A reformer in accordance with claim 33 wherein said reactor has a plurality of openings formed therein.

* * * * *